F. S. WALTERS.
INTERCHANGEABLE COUNTERBORE.
APPLICATION FILED JAN. 11, 1911.

1,016,116.

Patented Jan. 30, 1912.

Witnesses.
Oliver M. Kappler
Harold E. Smith

Inventor
Francis S. Walters
By J. B. Hull
Attorney

UNITED STATES PATENT OFFICE.

FRANCIS S. WALTERS, OF WILKINSBURG, PENNSYLVANIA, ASSIGNOR TO NATIONAL TOOL COMPANY, OF CLEVELAND, OHIO, A CORPORATION OF OHIO.

INTERCHANGEABLE COUNTERBORE.

1,016,116.  Specification of Letters Patent.  Patented Jan. 30, 1912.

Application filed January 11, 1911. Serial No. 602,028.

*To all whom it may concern:*

Be it known that I, FRANCIS S. WALTERS, a citizen of the United States, residing at Wilkinsburg, in the county of Allegheny and State of Pennsylvania, have invented a certain new and useful Improvement in Interchangeable Counterbores, of which the following is a full, clear, and exact description, reference being had to the accompanying drawings.

This invention relates to counter bores or tools for cutting away the metal around a bolt hole to receive the head of a bolt or screw, though many of the features of the invention are equally applicable to reamers and other cutting tools of like nature.

The object of the invention is to provide a tool in which a single shank may be provided with any one of a plurality of cutters of different size or in which the cutter may be removed from the shank for sharpening without removing the shank from the machine in which it is mounted, and in which the cutter will always be positively and exactly centered with respect to such shank when placed in operative position thereon.

Another object is the provision of a tool which shall embody, together with the above features, an interchangeable pilot, or centering device, which may be employed with any of the cutters with which the tool may be equipped, and which may be of any desired diameter or length dependent upon the work to be performed, and which shall serve both to center the cutter upon the shank and with regard to the work.

Other objects and advantages of the invention will appear from the following description and claims.

Figure 1:
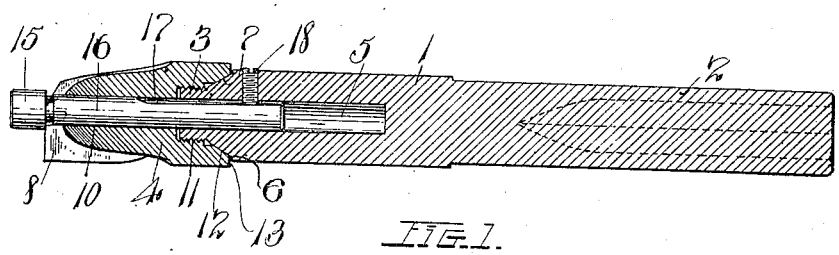
Figure 2:
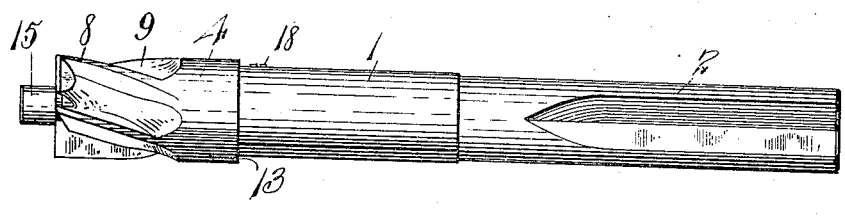
Figure 3:
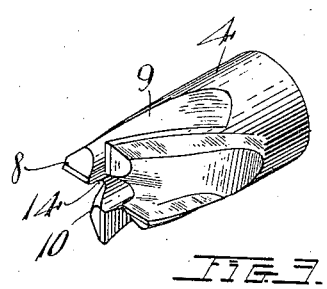

One embodiment of my invention is illustrated in the accompanying drawings, in which:

Figure 1 is a longitudinal sectional view of the assembled tool; Fig. 2 is a side elevation of the same; and Fig. 3 is a perspective view of the cutter.

Describing the parts by reference characters, 1 indicates the shank, having at one end a portion 2 shaped for engagement in a lathe-chuck, turret-head, or drill press, and having at the other end a threaded boss or projection 3 for the reception of the cutter 4. The axis of the boss is in strict alinement with the axis of the shank and is formed with an axial socket 5, which extends well into the shank. At its forward end the shank preferably terminates in an abrupt shoulder 6, and between this shoulder and the threaded portion of the boss a conical portion 7 is formed.

The cutter is of cylindrical form and has at its forward end a plurality of cutting teeth or edges 8, the same being "backed off" in the usual manner, and having the front face of each tooth separated from the back of the preceding tooth by the inclined or spiral groove 9, the angle of such groove being of the degree necessary to give the required inclination or "rake". An axle hole 10 is formed through the cutter, the forward portion thereof being of exactly the same diameter as the recess 5, and the rear portion thereof being enlarged and threaded as at 11, to receive the threaded boss 3. The outer rear end of this enlargement is flared as at 12 complementarily to the conical portion of the shank and is adapted to be seated and centered thereon, the rear end of the cutter, outside said flared portion being squared as at 13 and extended outwardly to a diameter sufficient to provide the required strength at this point. The angle of slope of this conical portion is preferably in the neighborhood of 30°, and the threads in the recessed portion 11 terminate a little short of the extremity of the flared portion so as not to engage the end of the cone. In order to prevent the spreading effect of the conical portion 7 from splitting the cutter, the rear end thereof may be hardened to a less degree than the forward end as indicated by the difference in density of the cross hatching in Fig. 1. This expedient provides teeth of the required hardness combined with a body of great toughness, though such an arrangement is not essential to the practice of my invention.

At the outer end of the cutter the grooves 9 are preferably cut entirely through into the hole 10 so as to form notches 14, which serve to permit a more perfect clearance for chips and also markedly facilitate the sharpening of the cutters. As the cutters are ground down this groove is also cut out so as always to provide these notches. The cutting edges may either be square with the axis as illustrated, or may be at an angle thereto as will be obvious, and their number may be either greater or smaller than that shown.

The pilot is indicated at 15 and comprises a shank 16 accurately fitting the hole through the cutter and boss and having a flat side adapted to be engaged by the set-screw 18. This flattened portion is preferably tapered forwardly to form a more secure bearing. The head of the pilot may be made of any desired size and several sizes of pilot may be provided with each cutter, depending upon the necessity of the work. In fact the head may be of smaller diameter than the shank if desired, though the need of this combination will be less frequently experienced.

Upon screwing the cutter upon the shank the rear end will be accurately centered by the engagement of the conical portions, notwithstanding any slight irregularity of the threads, and the pilot shank will accurately center the forward end of the cutter as regards the tool shank.

What I claim is:

1. In a counterbore or like tool, the combination, with a shank having a threaded axial boss at its forward end and an axial recess opening through said boss, of a removable cutter having an axial perforation adapted for alinement with said recess and a threaded socket adapted to receive said boss, and a pilot having a shank adapted of a size to fit snugly within said cutter perforation whereby said cutter may be centered upon said tool shank.

2. In a counterbore or like tool, the combination, with a shank having a threaded axial boss at its forward end and a conical or flaring portion at the base of said boss and also having an axial recess opening through said boss, of a cutter having a threaded socket adapted to receive said threaded boss, the outer portion of said socket being flared complementarily to the conical portion of said shank and adapted to seat thereon, said cutter also having an axial bore of the same diameter as said recess and adapted to be brought into alinement therewith when said cutter is screwed upon said boss, and a pilot having a shank adapted to pass through and closely fit said bore and to be secured in said recess.

3. In a counterbore, the combination, with a shank having a threaded axial boss at its forward end and a conical or flaring portion at the base of said boss, of a cutter having cutting teeth at its forward end and having at its rearward end an internally threaded axial socket adapted to receive said threaded boss, the outer portion of said socket being flared complementarily to the conical portion of said shank and adapted to seat thereon, the rear end of said cutter being hardened to a less degree than the forward end thereof.

In testimony whereof, I hereunto affix my signature in the presence of two witnesses.

FRANCIS S. WALTERS.

Witnesses:
JAMES BROWN,
W. E. WILLOCK.